United States Patent [19]
Kurze et al.

[11] Patent Number: 5,487,825
[45] Date of Patent: Jan. 30, 1996

[54] METHOD OF PRODUCING ARTICLES OF ALUMINUM, MAGNESIUM OR TITANIUM WITH AN OXIDE CERAMIC LAYER FILLED WITH FLUORINE POLYMERS

[75] Inventors: Peter Kurze; Hans-Jürgen Kletke, both of Düren, Germany

[73] Assignee: Electro Chemical Engineering GmbH, Zug, Switzerland

[21] Appl. No.: 981,343

[22] Filed: Nov. 25, 1992

[30] Foreign Application Priority Data

Nov. 27, 1991 [DE] Germany .................. 41 39 007.5

[51] Int. Cl.⁶ .................................................. C25D 9/06
[52] U.S. Cl. .................. 205/200; 205/199; 205/201; 205/204; 205/321; 205/322; 205/324
[58] Field of Search ................ 204/164; 205/199, 205/200, 201, 203, 204, 229, 316, 321, 322, 324

[56] References Cited

U.S. PATENT DOCUMENTS

| | | | |
|---|---|---|---|
| 3,355,371 | 11/1967 | Hile et al. | 204/164 |
| 3,615,405 | 10/1971 | Shebanow | 205/201 X |
| 3,658,672 | 4/1972 | Norris | 204/153.1 |
| 3,834,999 | 9/1974 | Hradcovsky et al. | 204/56 R |
| 3,862,892 | 1/1975 | Lautenschlager et al. | 205/50 |
| 4,082,626 | 4/1978 | Hradcovsky | 205/106 |
| 4,518,468 | 5/1985 | Fotland et al. | 205/204 |
| 4,846,837 | 7/1989 | Kurze et al. | 623/16 |
| 4,869,789 | 9/1989 | Kurze et al. | 204/56.1 |
| 4,970,560 | 11/1990 | Lindblad et al. | 355/299 |
| 5,009,959 | 4/1991 | Matsushita et al. | 428/419 |
| 5,024,591 | 6/1991 | Nakajima | 418/178 |
| 5,035,781 | 7/1991 | Schmidt et al. | 204/129.9 |
| 5,100,308 | 3/1992 | Gevelhoff et al. | 418/30 |
| 5,147,515 | 9/1992 | Honagata et al. | 204/164 |

FOREIGN PATENT DOCUMENTS 289065  4/1991  German Dem. Rep.

*Primary Examiner*—John Niebling
*Assistant Examiner*—William T. Leader
*Attorney, Agent, or Firm*—Cohen, Pontani, Lieberman & Pavane

[57] ABSTRACT

A method of producing composite oxide ceramic fluorine polymer layers on articles of aluminum, magnesium, titanium or their alloys, particularly of light metal components, includes introducing particles of fluorine polymers into the capillary system of an oxide ceramic layer. The particles have a particle size which at least in one dimension is smaller than the diameter of the capillaries. The article is then subjected to alternating pressure conditions.

4 Claims, 1 Drawing Sheet

METHOD OF PRODUCING ARTICLES OF ALUMINUM, MAGNESIUM OR TITANIUM WITH AN OXIDE CERAMIC LAYER FILLED WITH FLUORINE POLYMERS

BACKGROUND OF THE INVENTION

1. Field of the Invention

The present invention relates to a method of producing composite oxide ceramic and fluorine polymer layers on articles of aluminum, magnesium, titanium or their alloys, particularly of light metal components which are used in turbine driven pumps and in turbine technology. Also, the present invention relates to articles produced by the method.

2. Description of the Related Art

Components which rotate at high rates of rotation and which come into contact with corrosively acting media are made of metals which are either themselves chemically very resistant but expensive, or coating methods are used. For example, rotor and stator of turbine-driven molecular pumps which operate at rates of rotation of between 25,000 and 60,000 rpm are made of light metal alloys and are anodically oxidized in an aqueous electrolyte for protection against wear and corrosion due to gas/solid/liquid reactions. Rotors of molecular pumps which were provided with these protective layers and were used for pumping plasma-activated chlorine did have substantially longer service lives than rotors having other protective layers. However, these rotors did not meet fully the high demands made under the operating conditions of plasma-etching of aluminum or aluminum alloys with chlorine-containing gases which is conventionally used in the manufacture of micro-electronic components.

Light metals are frequently also used in aviation and space technology. In addition, magnesium and magnesium alloys have recently been used (Praxisforum 12/88: "Neue Werkstoffe und Oberflächenschichten bei Metallen und Polymeren in Entwicklung und Anwendung" [Development and Use of New Materials and Surface Coatings in Metals and Polymers]. N. Zeuner, G. Betz "Neue Magnesiumlegierungen für die Luftfahrt- and Automobilindustrie") [New Magnesium Alloys for the Aviation and Automobile Industries.]

It is known in the art to manufacture oxide ceramic layers on barrier-layer forming metals or their alloys by a plasma-chemical anodic oxidation in aqueous organic electrolytes (P. Kurze; Dechema-Monographien Volume 121 -CH Verlagsgesellschaft 1990, pages 167 to 180 with additional literature references). The composition of such oxide ceramic layers is schematically illustrated in the reference. A thin tightly adhering barrier layer is provided on a metal, for example, aluminum. The barrier layer has a thickness of up to approximately 1 μm and is very tightly connected to the metal. An oxide ceramic layer having few pores is sintered on the barrier layer. Because the molten oxide ceramic layer is quickly cooled by the electrolyte on the side toward the electrolyte, the gases which are still flowing away, particularly oxygen and water vapor, form an oxide ceramic layer having a wide-mesh linked capillary system. Examinations using electron scan microscopes determined pore diameters of 0.1 μm to 30 μm (CERAMIC COATINGS BY ANODIC SPARK DEPOSITION G. P. Wirtz et al., MATERIALS AND MANUFACTURING PROCESSES 6 (1), 87–115 (1991), particularly FIG. 12).

These known ceramic layers have thicknesses of at most 30 μm which is insufficient when they are used as wear and corrosion protection layers.

By utilizing improvements of the method of the anodic oxidation with spark discharge which is the subject of a patent application filed concurrently herewith having the title "Method of Producing Oxides Ceramic Layers on Barrier Layer-Forming Metals", it is possible, inter alia, on aluminum, magnesium, titanium or their alloys to produce oxide ceramic layers which have substantially greater layer thicknesses of up to 150 μm and are very abrasion resistant and corrosion resistant. This method disclosed in the above-mentioned application Ser. No. 07/982,092, filed Nov. 11, 1992, now U.S. Pat. No. 5,385,662 is expressly incorporated herein by reference.

SUMMARY OF THE INVENTION

It is the object of the present invention to provide protective layers for components of aluminum, magnesium, titanium or their alloys which are subjected to high loads, wherein the protective layers are corrosion resistant and extremely wear resistant even under extreme conditions. This is applicable particularly for light metal components which are surrounded by turbulent flow, for example, rotors of pumps with high rates of rotation, such as, turbine-driven molecular pumps, turbine blades, turbochargers, the outer skin of aircraft and rockets, but also for special components in vacuum technology and plasma technology, rollers for corona discharge or ultrasonic sonotrodes.

In accordance with the present invention, articles of aluminum, magnesium, titanium or their alloys which have already been provided in the conventional manner with an oxide ceramic layer which has a wide-mesh linked capillary system are treated by introducing particles of fluorine polymers into the outer oxide ceramic layer, wherein the particles of fluorine polymers are at least in one dimension smaller than the diameter of the capillaries and the article with the prefilled capillary system is subjected to alternating pressure conditions.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWING

In the Drawing:

The single FIGURE of the drawing is a schematic view of a portion of a composite oxide ceramic polymer layer produced in accordance with the present invention.

DESCRIPTION OF THE PREFERRED EMBODIMENTS

Figure 1:
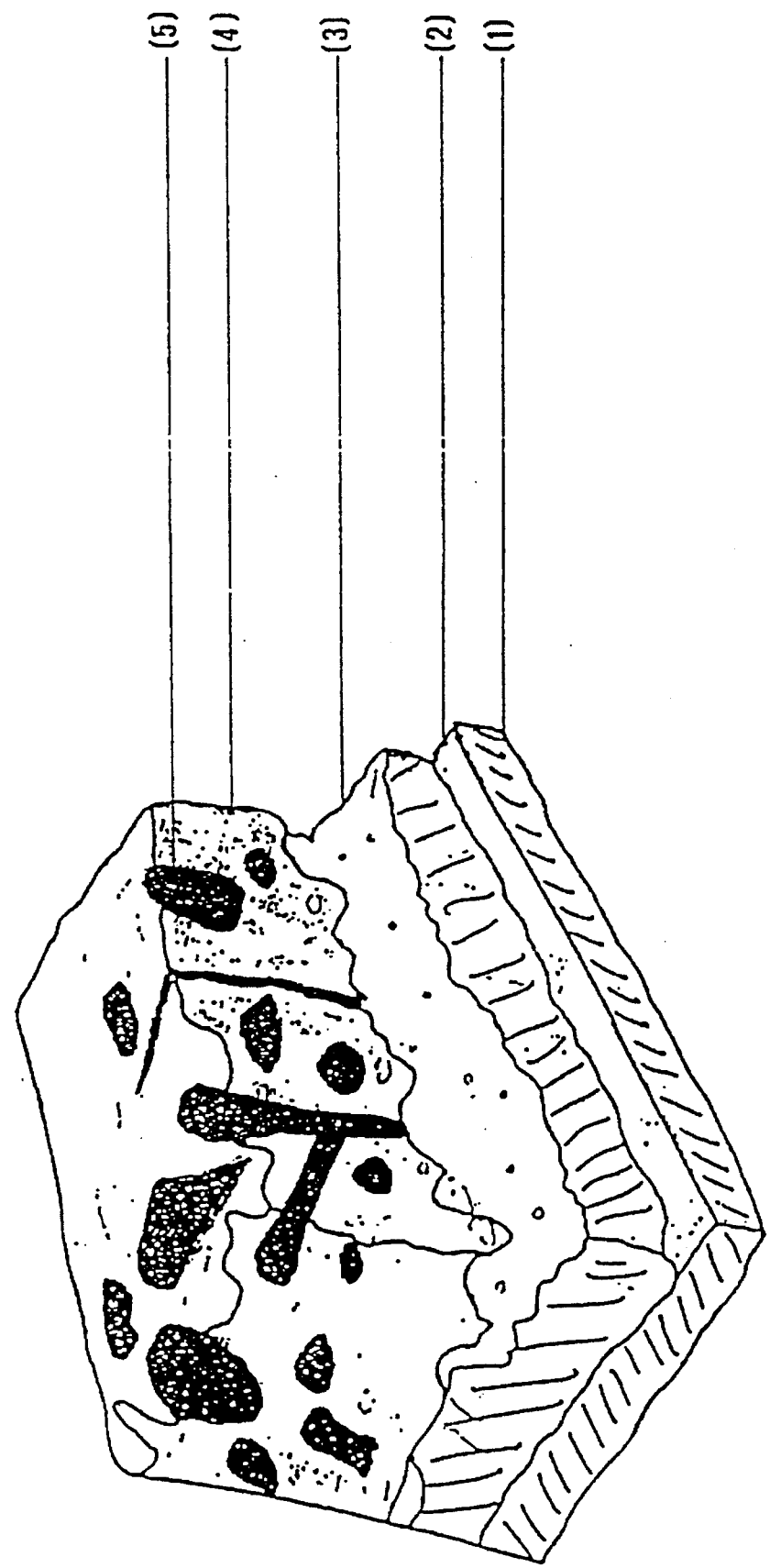

The method is preferably carried out on articles which have been provided with an oxide ceramic layer having a thickness of 40 to 150 μm, particularly 50 to 120 μm, in accordance with the method of the above-mentioned patent application which is being filed concurrently herewith.

Suitable fluorine polymers are particularly the polymers and copolymers of tetrafluoroethylene, hexafluoropropene, vinylidenefluoride, vinylfluoride and trifluorochloroethylene. Preferred for the purposes of the present invention are polytetrafluoroethylene (PTFE), polyvinylidenefluoride (PVDF), polyvinylfluoride (PVF), polytrifluorochloroethylene (PCTFE), as well as TFE-copolymers. With respect to trade names and details concerning the methods of manufacture of these fluorine polymers, reference is made to Winnacker-Küchler, Chemische Technologie, 4th Edition, Volume 6, Section "Kunststoffe" [plastics], 4.5 fluorine polymers, pages 407–410.

The particles of the fluorine polymers or their preceding stage to be introduced into the outer oxide ceramic layer are available, as far as they are not liquids, in the form of solutions or suspensions in a suitable solvent, for example, water. PTFE is commercially available as an aqueous dispersion with particles having a size of 0.2 to 1 μm. If powder or suspensions having the particle size required for the purposes of the invention are not commercially available, they can be produced with suitable colloid grinding methods. Fluorine polymers are usually manufactured by suspension or emulsion polymerization. For example, PTFE is technically manufactured by radical polymerization of tetrafluoroethylene in a predominantly aqueous liquor which also contains the catalyst system. It is possible to determine the particle size of the fluorine polymers required for the purposes of the invention by the duration of the polymerization and to limit the particle size in such a way that they do not become larger than, for example, 10 to 50 μm.

The portion of fluorine polymers, particularly PTFE, in the oxides ceramic layer increases with decreasing polymer particle size. Therefore, in actual practice, a dispersion is used having PTFE particles with a size of 0.1 to 10 μm, particularly 0.3 to 5 μm.

The particles of fluorine polymers are introduced into the pores of the oxide ceramic layer by subjecting the article provided with the oxide layer in the presence of a dispersion of the particles of the fluorine polymers or their preceding stage in a suitable inert solvent to alternating pressure conditions. Suitable for this purpose is an impregnating system in which initially air is removed from the capillary system of the oxide ceramic layer by means of a vacuum. This may be done in the presence of the above-mentioned polymer suspension or solution or also by subjecting the vacated porous oxide ceramic layer in the vacuum to the liquid polymer systems. Under the influence of the vacuum, the particles enter into the pores and, after the vacuum has been canceled, are pressed into the pores by the atmospheric pressure and, as a result, reach even the smallest branches of the capillary system. The change between vacuum and pressure, which may also exceed the atmospheric pressure, is repeated once or several times as necessary. Apparatus suitable for this introduction of the particles of fluorine polymers into the oxide ceramic layer of the articles are available, for example, in the form of a Maldan-type impregnating system.

If light metal components which are subjected to turbulent flow are to be sealed in a frictionally engaging manner with the fluorine polymers in accordance with the present invention, the operating conditions with the changing pressure conditions can be utilized for the introduction of the fluorine polymers into the capillary system and for compacting the polymers. This requires a presealing stage in which the porous oxide ceramic layer is impregnated with the fluorine polymer. Subsequently, a final sealing stage is carried out in which the component is subjected to the operating conditions of the turbulent flow. This can also be effected by means of a laminated composite system which, as described above, was already obtained by the influence of alternating pressure conditions in suitable apparatus.

For example, in the case of rotors of turbine-driven molecular pumps, the final sealing step is carried out in the turbine space of the pump, in which, because a laminar lower layer of flow is missing, unusually high polymolecularity parameters are reached. As a result of the pressure conditions in the turbine space, water and gas are essentially removed from the oxide ceramic layer with the wide-mesh linked capillary system and the fluorine polymer already present is anchored in a frictionally engaging manner. The flow behavior of the polymer and its possible volume increase as in PTFE contribute to the frictionally engaging anchoring of the polymer. PTFE is particularly suitable in this case. This final sealing of the laminated composite of the oxide ceramic fluorine polymer is effected by the injector effect during the extreme alternating pressure conditions and the high energy densities within very small areas. Micrographs and images from electron scan microscopes show that after final sealing the capillary system of the laminated composite oxide ceramic polymer is completely filled out with the fluorine polymers 5, as schematically shown in the drawing.

The composite oxide ceramic polymer layer obtained by the method according to the present invention has excellent adherence toward the metal, is corrosion and wear resistant, vacuum stable and has an usually high alternating bending strength, which is not the case in conventionally anodically produced oxide layers, for example, eloxal layers.

If desired, it is also possible not only to fill the outer oxide ceramic layer with the wide-mesh linked capillary system with the fluorine polymers, but also to cover the outer surface with the fluorine polymers. This layer is anchored in the porous oxide ceramic layer by the capillaries which extend to the surface. Advantageously, this cover layer of fluorine polymers has a thickness of up to 5 μm, particularly 0.5 to 2 μm.

If the fluorine polymers introduced into the pores or the capillaries are not already present as a coherent mass in the pores or capillaries and on the surface in the form of a plastics material film, the fluorine polymers can be sintered by means of known technologies by heating at least the surface of the light metal articles or they can be melted together if they are thermoplastic.

In accordance with the improved method for the anodic oxidation under spark discharge disclosed in the above-mentioned patent application which is being filed concurrently herewith, the method for applying an oxide ceramic polymer layer on objects of aluminum, magnesium, titanium or their alloys is carried out by plasma-chemically oxidizing the article in a chloride-free electrolytic bath having a pH value of 2 to 8 at a constant current density of at least 1 $A/dm_2$ until the voltage reaches an end value. The electrolyte residues are then removed from the oxide ceramic layer and particles of fluorine polymers, particularly PTFE, which are in at least one dimension smaller than the diameter of the capillaries are subsequently introduced into the upper aluminum oxide ceramic layer having the wide-mesh linked capillary system, and the article with the prefilled capillary system is subjected to alternating pressure conditions.

In the special case of applying an oxide ceramic polymer layer on a rotor of a turbine-driven molecular pump, the rotor is plasma-chemically oxidized in a chloride-free electrolytic bath having a pH value of 7 to 8 at a constant current density of at least 1 $A/dm^2$ until the voltage reaches an end value. The electrolyte residues are then removed from the oxide ceramic layer and particles of fluorine polymers, particularly PTFE, which at least in one dimension are smaller than the diameter of the capillaries, are introduced into the upper aluminum oxide ceramic layer with the wide-mesh linked capillary system, and the rotor with the capillary system filled with PTFE is subjected to operating conditions in the molecular pump.

As mentioned above, the present invention is also directed to components which are provided with the composite oxide ceramic polymer layer. As illustrated in the drawing, the oxide ceramic polymer layer is composed of a thin barrier layer 2 which adheres to the metal 1. A sintered tight oxide ceramic layer 3 is provided on the barrier layer 2 and an oxide ceramic layer having a wide-mesh linked capillary system 4 is provided on layer 3. The capillary system 4 is filled substantially with fluorine polymers 5.

The present invention is also directed to rotors for turbine-driven molecular pumps, special components of vacuum technology or plasma technology, rollers for corona discharge, ultrasonic sonotrodes and the outer skin of aircraft or rockets, each composed of aluminum or aluminum alloys and having the composite oxide ceramic polymer layer of the composition described above.

Within the scope of the present invention, aluminum and their alloys are very pure aluminum and the alloys AlMn; AlMnCu; AlMgl; AlMgl,5; E-AlMgSi; AlMsSiO,5; AlZn-MgCuO,5; AlXnMgCul,5; G-AlSi-12; G-AlSi5Mg; G-AlSi8Cu3; G-AlCu4Ti; G-AlCu4TiMg.

In addition, suitable for the purposes of the present invention are very pure magnesium and the magnesium cast alloys of the ASTM designations AS41, AM60, AZ63, AZ81, AZ91, AZ92, HK31, QE22, ZE41, ZH62, ZK51, ZK61, EZ33, HZ32, and wrought alloys AZ31, AZ61, AZ 80, M1, ZK60, ZK40.

It is also possible to use pure titanium or titanium alloys, such as, TiAl6V4; TiAl5Fe2,5, etc.

EXAMPLE 1

A rotor of a turbine-driven molecular pump of a metal alloy (1) Al MgSi1 having a surface area of 25 dm$^2$ is degreased, is pickled for 30 seconds in 10% NaOH and is washed in distilled water.

Subsequently, the rotor is coated in a chloride-free electrolytic bath, which has a pH value of 7.6 and the following composition,

| | |
|---|---|
| 0.13 | mol/l Sodium Ions |
| 0.28 | mol/l Ammonium Ions |
| 0.214 | mol/l Phosphate Ions |
| 0.238 | mol/l Borate Ions |
| 0.314 | mol/l Fluoride Ions |
| 0.6 | mol/l Hexamethylenetetramine | at a current density of 4 A/dm$^2$ and an electrolyte temperature of 12° C.±2° C. for 40 minutes by means of a plasma-chemical anodic oxidation until a voltage end value of 253 volts is reached automatically. The rotor is then washed intensively with distilled water. The sintered oxide ceramic layer 3 which has few pores has a thickness of 10 μm and the oxide ceramic layer having the wide-mesh linked capillary system 4 has a thickness of 28 μm.

The rotor pretreated in this manner is presealed with polymer 5. For this purpose, the rotor is immersed and moved within an aqueous anionic PTFE dispersion having a particle size of 0.3 μm. The rotor is then washed under a flow of hot water (90° C.) and is dried with hot air.

The presealed rotor is used in an etcher at a maximum rate of rotation of 60,000 rpm. Final sealing is concluded after approximately 10 hours. The rotor treated with the method according to the present invention has a service life which is 4 times longer than that of a rotor which is provided with an oxide ceramic layer by means of a known anodic plasma-chemical method.

EXAMPLE 2

The surface of a roller of the alloy Al MgSi1 having a diameter of 150 mm and a length of 400 mm is plasma-chemically anodically oxidized in the electrolyte of Example 1 at a current density of 2 A/dm$^2$. The oxide ceramic layer has a thickness of 50 μm. Subsequently, the coated layer is washed with distilled water in order to remove the electrolyte residues. The plasma-chemically anodically oxidized roller which is still moist is immersed for 5 minutes at room temperature in an aqueous PTFE dispersion in which the PTFE particles have a size of 1 to 5 μm. The rotor is then washed with water and dried. The roller is subjected to corona discharge in the technological process. The ceramic layer impregnated with PTFE is stable relative to corona discharge.

EXAMPLE 3

A compressor wheel of the alloy Al Cu2Mg1, 5 NiFe having a surface area of 100 dm$^2$ is plasma-chemically anodically oxidized in the electrolyte of Example 1 at a current density of 1 A/dm$^2$. The oxide ceramic layer has a thickness of 45 μm.

Subsequently, the compressor wheel is rinsed with distilled water in order to remove the electrolyte residues. The plasma-chemically anodically oxidized compressor wheel which is still moist is immersed for 5 minutes at room temperature in an aqueous PTFE dispersion in which the PTFE particles have a size of 1 to 5 μm. Subsequently, the compressor wheel is washed with water and dried. The compressor wheel has a service life which is 4 times that of a compressor wheel having other conventional coatings.

EXAMPLE 4

An ultrasonic sonotrode of AlZnMgCu1,5 having a surface area of 6.4 dm$^2$ is degreased and subsequently washed with distilled water.

The ultrasonic sonotrode treated in this manner is plasma-chemically anodically oxidized in an aqueous/organic chloride-free electrolytic bath according to Example 1 at a current density of 3.5 A/dm$^2$ and an electrolyte temperature of 15° C. The voltage end value of 250 volts is reached after a coating period of 25 minutes.

The ultrasonic sonotrode with a ceramic layer is washed with water and immersed 3 times for 1 minute in the moist state in an aqueous PTFE dispersion in which the PTFE particles have an average particle size of 0.3 μm and the sonotrode is washed each time with hot water (60° C.). Subsequently, the sonotrode is washed under a flow of hot water (60° C.) and is dried by hot air.

The oxide ceramic layer filled with fluorine polymer has a thickness of 30 μm. The ultrasonic sonotrode exhibits no cracks in the oxide ceramic layer during use, as it has been found in comparable eloxal layers.

It should be understood that the preferred embodiments and examples described are for illustrative purposes only and are not to be construed as limiting the scope of the present invention which is properly delineated only in the appended claims.

What is claimed is:

1. A method of manufacturing an article of aluminum, magnesium, titanium or alloys thereof, comprising:

generating by a plasma-chemical anodic oxidation in a chloride-free electrolytic bath having a pH value of 2 to 8 a thin barrier layer tightly adhering to the metal, a sintered tight oxide ceramic layer on the barrier layer and a wear-resistant upper oxide ceramic layer on the tight oxide ceramic layer, the upper oxide ceramic layer having a thickness of from 40 to 150 μm and a wide-mesh linked capillary system, each capillary of the capillary system having a diameter;

applying particles of a flourine polymer to the upper oxide layer; and depositing the flourine polymer into the capillary system by subsequently subjecting the article to alternating pressure conditions; said fluorine particles having a particle size which in at least one dimension is smaller than the diameter of the capillaries.

2. The method according to claim 1, further comprising using a constant current density of at least 1 A/dm$^2$ until the voltage reaches an end value.

3. A method of manufacturing an article of aluminum, magnesium, titanium or alloys thereof, comprising:

generating a thin barrier layer adhering to the metal, a sintered tight oxide ceramic layer on the barrier layer and a wear-resistant upper oxide ceramic layer on the tight oxide ceramic layer, the upper oxide ceramic layer having a wide-mesh linked capillary system, each capillary of the capillary system having a diameter;

said layers being generated by a plasma-chemical anodic oxidation of the article in a chloride-free electrolytic bath having a pH value of 2 to 8 at a constant current density of at least 1 A/dm$^2$ until the voltage reaches an end value;

applying particles of a fluorine polymer to the upper oxide ceramic layer; and subsequently subjecting the article to alternating pressure conditions so as to deposit the fluorine polymer into the capillary system; said fluorine particles having a particle size which in at least one dimension is smaller than the diameter of the capillaries.

4. A method of applying a wear-resistant oxide ceramic polymer layer on a rotor of aluminum or aluminum alloy for turbine-driven molecular pumps, the method comprising plasma-chemically anodically oxidizing the rotor in a chloride-free electrolytic bath having a pH value of 7 to 8 at a constant current density of at least 1 A/dm$^2$ until the voltage reaches an end value to form an oxide ceramic layer having a wide-mesh linked capillary system, removing electrolyte residues from the oxide ceramic layer, subsequently, introducing particles of fluorine polymers into the capillary system, each capillary of the capillary system having a diameter, wherein the particles have a particle size which at least in one dimension is smaller than the diameter of the capillaries, and subsequently subjecting the rotor to operating conditions in the molecular pump.

* * * * *